United States Patent
Ohta et al.

[11] Patent Number: 5,847,416
[45] Date of Patent: Dec. 8, 1998

[54] PHOTOTRIGGER THYRISTOR

[75] Inventors: Kenji Ohta; Katumi Satoh, both of Tokyo, Japan

[73] Assignee: Mitsubishi Denki Kabushiki Kaisha, Tokyo, Japan

[21] Appl. No.: 650,996

[22] Filed: May 21, 1996

[30] Foreign Application Priority Data

Dec. 20, 1995 [JP] Japan .................................. 7-332124

[51] Int. Cl.⁶ .................. H01L 29/74; H01L 21/111; H01L 31/0232
[52] U.S. Cl. ........................ 257/113; 257/116; 257/432
[58] Field of Search .................................... 257/113, 116, 257/117

[56] References Cited

U.S. PATENT DOCUMENTS 4,862,231   8/1989   Aband ...................................... 257/116

FOREIGN PATENT DOCUMENTS

| | | |
|---|---|---|
| 0 021 352 A1 | 1/1981 | European Pat. Off. . |
| 0 053 020 A | 6/1982 | European Pat. Off. . |
| 53-097446 A | 8/1978 | Japan . |
| 58-154268 A | 9/1983 | Japan . |
| 59-154063 A | 9/1984 | Japan . |
| 59-159568 | 9/1984 | Japan . |
| 60-84879 | 5/1985 | Japan . |
| 2-072310 A | 3/1990 | Japan . |

*Primary Examiner*—Wael Fahmy
*Attorney, Agent, or Firm*—Oblon, Spivak, McClelland, Maier & Neustadt, P.C.

[57] ABSTRACT

A light travelling from a light transmission window (8) to a light receiving part (2) is transmitted first through a first light guide (11) of linear single core construction and next through a second light guide (12) which is bent and of multicore construction. Single core construction achieves a high light mixing effect, and accordingly the first light guide (11) makes a distribution of light intensity uniform. On the other hand, multicore construction has little light mixing effect, and raises little variation in distribution of incident light intensity. In other words, the second light guide (12) transmits the light to the light receiving part (2) without breaking the uniform distribution of light intensity achieved by the first light guide (11).

14 Claims, 6 Drawing Sheets

PHOTOTRIGGER THYRISTOR

BACKGROUND OF THE INVENTION

1. Field of the Invention

The present invention relates to a phototrigger thyristor.

2. Description of the Background Art

FIGS. 10 to 14 are cross sectional views showing a process of manufacturing a phototrigger thyristor 200 in the background art step by step. The phototrigger thyristor 200 shown in FIG. 14 is disclosed in Japanese Patent Application Laid Open Gazette 60-241263, for example.

On a surface of a semiconductor base 1, a light receiving part 2 of the phototrigger thyristor 200 is formed. A positional ring 10 is placed on the semiconductor base 1 in the vicinity of the light receiving part 2 so that the light receiving part 2 may be exposed (see FIG. 10). An anode electrode 4 is provided on a back side of the semiconductor base 1 and put attaching to a flange 5a. The flange 5a is covered with an insulating tube 6 and further the insulating tube 6 is covered with a flange 5b. The insulating tube 6 is provided with a light transmission window 8 and a light guide insertion hole 9 (see FIG. 11).

A light guide 7 is prepared and its one end (for incidence) is inserted into the light guide insertion hole 9. During the insertion of the light guide 7, the other end (for outgoing radiation) of the light guide 7 is not directed towards the positional ring 10 (see FIG. 12). After inserting the one end of the light guide 7 into the light guide insertion hole 9, the other end of the light guide 7 turns to the positional ring 10 to be inserted therein (see FIG. 13).

A cathode electrode 3 is provided on a front surface of the semiconductor base 1. Thus, the cathode electrode 3, the anode electrode 4, the flanges 5a and 5b and the insulating tube 6 seal the surfaces of the semiconductor base 1 (see FIG. 14).

In the phototrigger thyristor 200 having the above construction, a light signal externally irradiated travels to the light receiving part 2 through the light transmission window 8 and the light guide 7. Then, a photoelectric current is generated inside the semiconductor base 1 to cause an ignition.

In the background-art phototrigger thyristor 200, there arises the following problems because the light is transmitted through the single light guide 7 from the light transmission window 8 to the light receiving part 2 and a direction of introducing the light and a direction of receiving the light form an angle of almost 90°.

If the light guide 7 is of a single core construction, having only one core, nonuniform distribution of light intensity is found in the light receiving part 2 since the light guide 7 is bent. Consequently, there disadvantageously exists variation in initial turn-on characteristics of the phototrigger thyristor.

If the light guide 7 is of a multicore construction, having a plurality of cores, the light guide 7 can transmit the light with high reproducibility even if bent. Accordingly, uniform distribution of light intensity is found in the light receiving part 2 if the distribution of incident light intensity is uniform, thus causing no degradation of the initial turn-on characteristics.

In general, however, an optical fiber is used for transmitting the light signal from the light source to the light transmission window 8 and has a face for outgoing radiation of much smaller diameter than the light receiving part 2. Accordingly, there arises a problem that an ignition is caused locally in the light receiving part 2 and a current crowding is liable to cause a breakdown.

SUMMARY OF THE INVENTION

The present invention is directed to a phototrigger thyristor. According to a first aspect of the present invention, the phototrigger thyristor comprises: a light receiving part for receiving light which serves as a trigger in a thyristor operation; a light guide having a face for outgoing radiation to transmit the light to the light receiving part and a face for incidence. In the phototrigger thyristor of the first aspect, the light guide includes a first portion which is almost linear, having the face for incidence; a second portion which is bent, having the face for outgoing radiation, and the first portion has a higher light mixing effect than the second portion.

According to a second aspect of the present invention, in the phototrigger thyristor of the first aspect, the first portion has fewer cores than the second portion.

According to a third aspect of the present invention, in the phototrigger thyristor of the second aspect, the first portion is of single core construction, and the second portion is of multicore construction.

According to a fourth aspect of the present invention, in the phototrigger thyristor of the third aspect, the second portion includes cores each having an almost hexagonal section.

According to a fifth aspect of the present invention, in the phototrigger thyristor of the first aspect, the first portion and the second portion are separated from each other at a distance D3, and the formulae $D1+2 \cdot D3 \cdot \tan \theta \leq D2$, $\theta = \sin^{-1}(A1/n)$, $A1 \leq A2$ are hold where D1 and D2 represent respective apertures of the first and second portions, A1 and A2 represent respective numerical apertures of the first and second portions and n represents an index of refraction of a substance separating the first and second portions.

According to a sixth aspect of the present invention, in the phototrigger thyristor of the first aspect, the second portion is tapering towards the light receiving part.

According to a seventh aspect of the present invention, in the phototrigger thyristor of the first aspect, the first portion and the second portion are separated from each other, the first portion is tapering towards the light receiving part, and the first portion has a smaller aperture at an end close to the light receiving part than an aperture at an end of the second portion away from the light receiving part.

In the phototrigger thyristor in accordance with the first aspect of the present invention, the first portion has a high light mixing effect, and accordingly it enhances the uniformity of the light intensity distribution while transmitting the incident light even if the light at the face for incidence has a nonuniform intensity distribution due to the small diameter of the incident light. On the other hand, since the second portion has a low light mixing effect, it can transmit the light without breaking uniformity of intensity distribution achieved by the first portion if bent.

Therefore, the light receiving part receives no particular local intense light, and it becomes possible to avoid a current crowding at the initial turn-on in the phototrigger thyristor to suppress a drop of di/dt capability.

The phototrigger thyristor in accordance with the second aspect of the present invention makes the light mixing effect of the first portion higher than that of the second portion and accordingly it can achieve the effect of the first aspect.

In the phototrigger thyristor in accordance with the third aspect of the present invention, the high light mixing effect of the first portion can be effectively achieved with simple construction.

In the phototrigger thyristor in accordance with the fourth aspect of the present invention, multicore construction with high filling rate is achieved.

The phototrigger thyristor in accordance with the fifth aspect of the present invention can suppress a loss in transmission of the light between the first and second portions and achieve easy alignment between the first and second portions.

The phototrigger thyristor in accordance with the sixth aspect of the present invention ensures proper transmission of uniform light to the light receiving part.

The phototrigger thyristor in accordance with the seventh aspect of the present invention can achieve easy alignment between the first and second portions and suppress a loss in transmission of the light between the first and second portions.

An object of the present invention is to provide a technique for ensuring high photographic sensitivity and stable turn-on characteristics and avoiding a drop of di/dt capability.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 10:
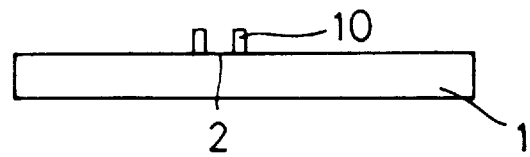
FIGS. 10 to 14 are cross sectional views showing a process of manufacturing a phototrigger thyristor 200 in the background art step by step.
Figure 11:
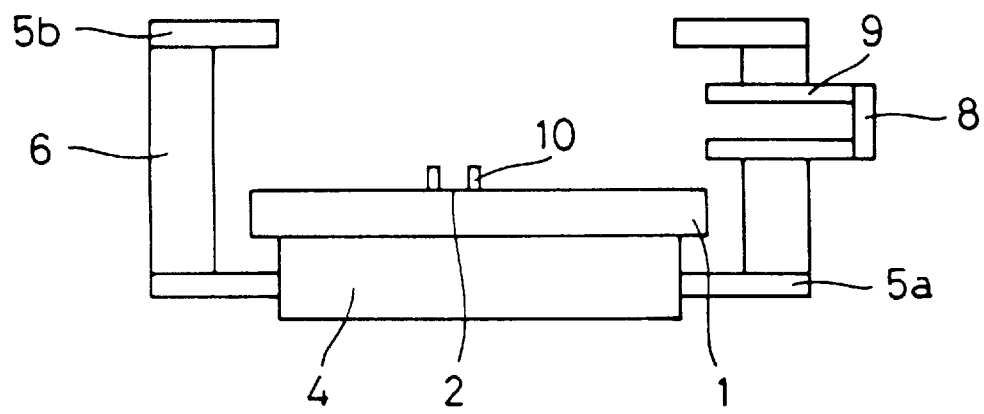
Figure 12:
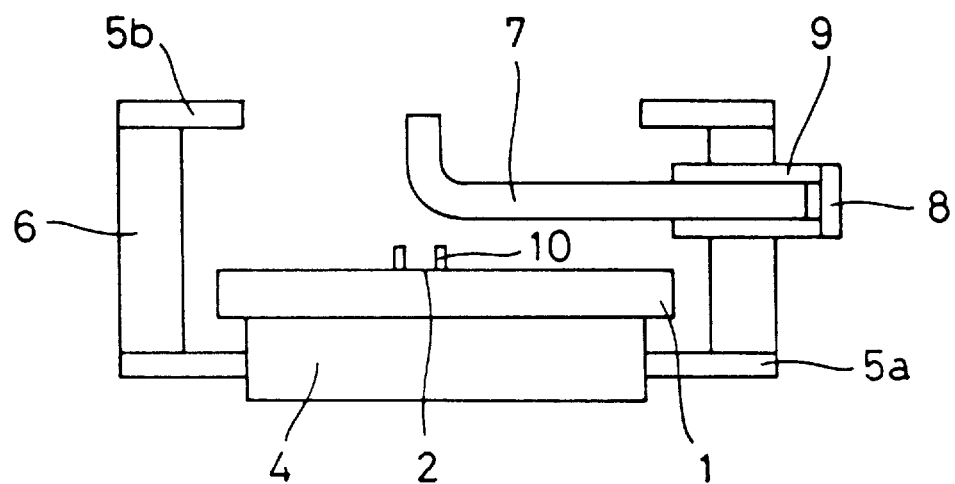
Figure 13:
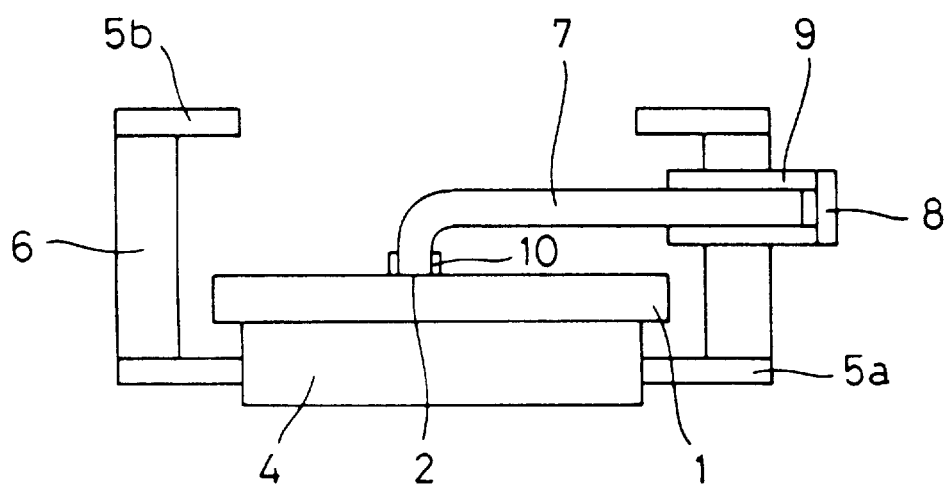
Figure 14:
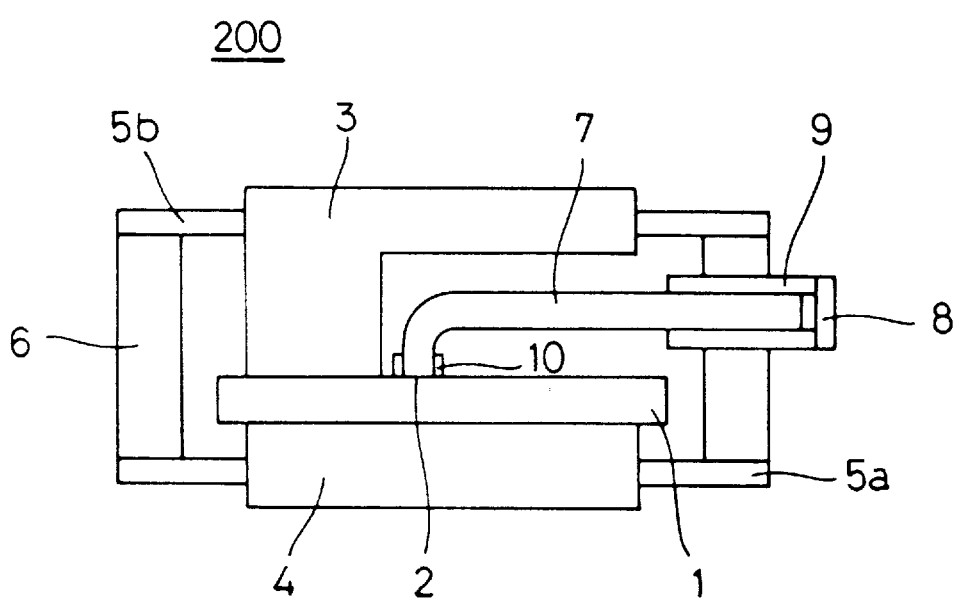

FIGS. 1 to 5 are cross sectional views showing a process of manufacturing a phototrigger thyristor 100 in accordance with the present invention step by step. Like FIG. 10, a light receiving part 2 of the phototrigger thyristor 100 is formed on a surface of the semiconductor base 1. A positional ring 10 is placed on the semiconductor base 1 in the vicinity of the light receiving part 2 so that the light receiving part 2 may be exposed (see FIG. 1). An anode electrode 4 is provided on a back side of the semiconductor base 1 and put attaching to a flange 5a. The flange 5a is covered with an insulating tube 6 and further the insulating tube 6 is covered with a flange 5b. The insulating tube 6 is provided with a light transmission window 8 and a light guide insertion hole 9 (see FIG. 2).

A first light guide 11 and a second light guide 12 which is bent at almost 90° are prepared and a face for outgoing radiation of the first light guide 11 and a face for incidence of the second light guide 12 are connected with each other at a joint region A. An end for incidence of the first light guide 11 is inserted into the light guide insertion hole 9. The first light guide 11 is almost linear from the face for incidence close to the light transmission window 8 to the face for outgoing radiation away therefrom, as will be discussed later in more detail. During the insertion of the first light guide 11, the face for outgoing radiation of the second light guide 12 is not directed towards the positional ring 10 (see FIG. 3).

Figure 1:
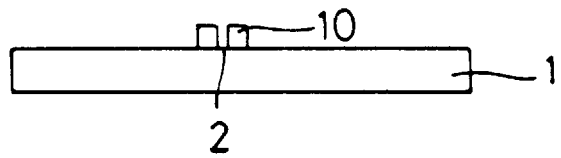
FIG. 1 to 5 are cross sectional views showing a process of manufacturing a phototrigger thyristor 100 in accordance with the present invention step by step.
Figure 2:
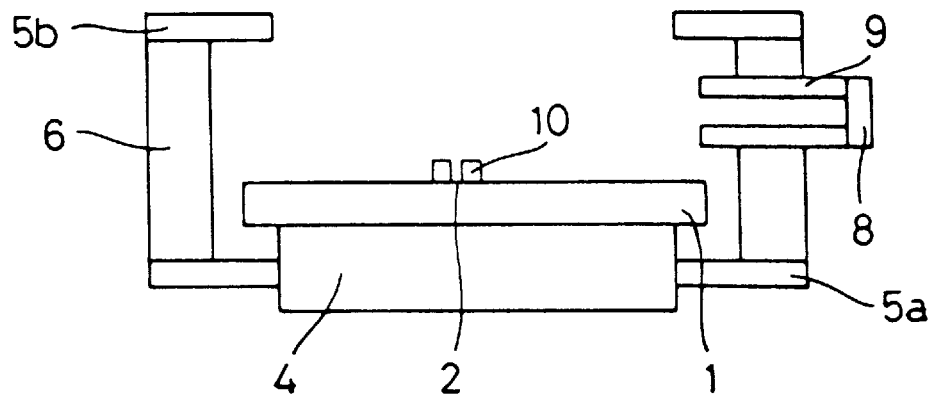
Figure 3:
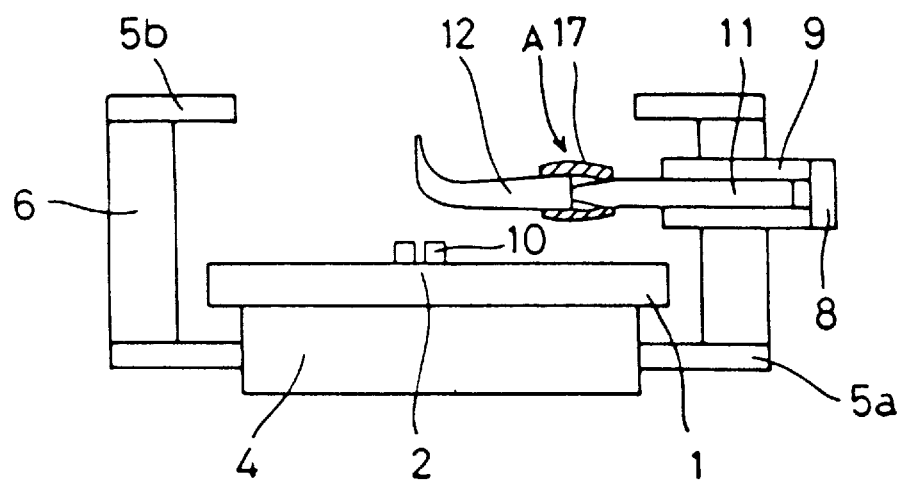
Figure 4:
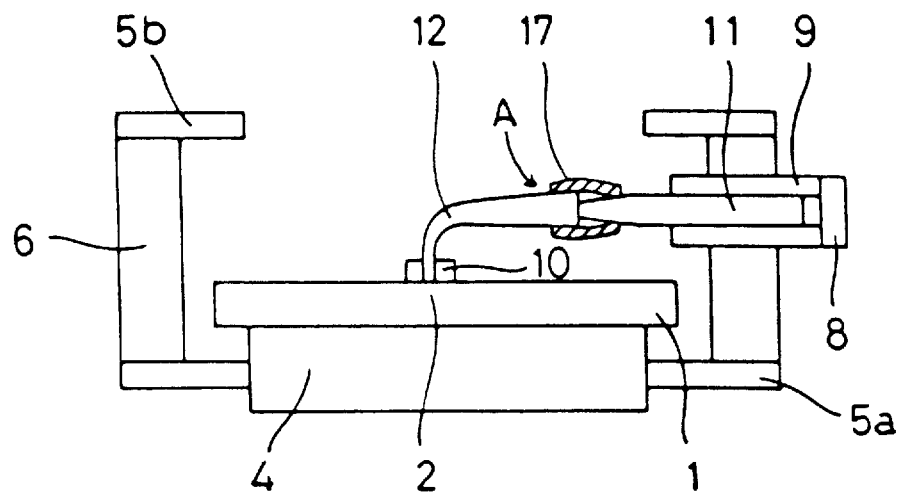
Figure 5:
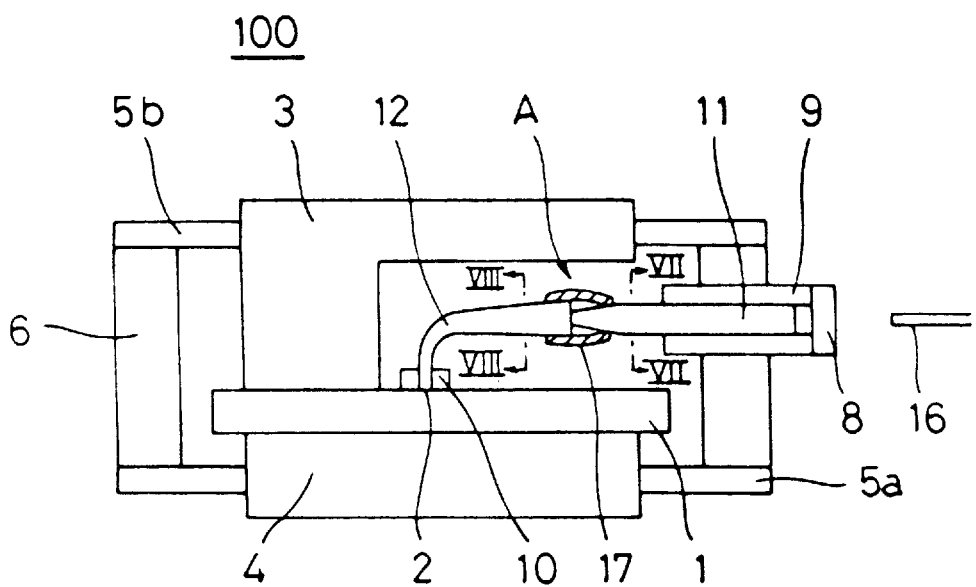

After connecting the second light guide 12 to the first light guide 11, the face for outgoing radiation of the second light guide 12 turns to the positional ring 10 to be inserted therein (see FIG. 4).

Figure 6:
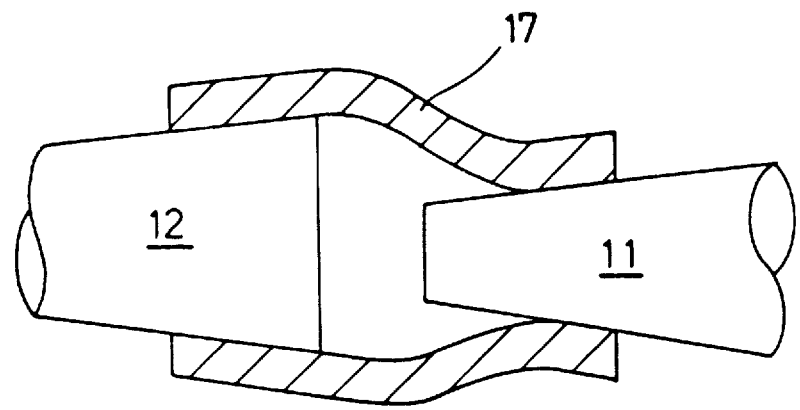
FIG. 6 is a magnified cross sectional view of a joint region A and its vicinity shown in FIGS. 3,to 5.

FIG. 6 is a magnified cross sectional view of the joint region A and its vicinity. As shown in FIG. 6, the face for outgoing radiation of the first light guide 11 and the face for incidence of the second light guide 12 are connected at the joint region A with a joint sheath 17 made of metal, for example.

Figure 7:
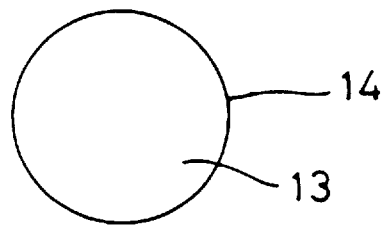
FIG. 7 is cross sectional view taken along the line VII—VII of FIG. 5.
Figure 8:
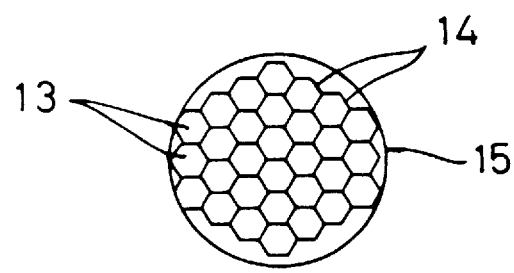
FIG. 8 is a cross sectional view taken along the line VIII—VIII of FIG. 5.

The first light guide 11 is of a single core construction, and the second light guide 12 is of a multicore construction. FIGS. 7 and 8 are cross sectional views taken along the lines VII—VII and VIII—VIII of FIG. 5, respectively. The first light guide 11 has a core 13 surrounded by a cladding 14. The second light guide 12 has cores 13 surrounded by claddings 14, respectively, and further surrounded by a coating member 15. Each of the cores 13 of the second light guide 12 is hexagon, and therefore the second light guide 12 can effectively contain a lot of cores 13 (in other words, with a high filling rate).

After the step of FIG. 4, a cathode electrode 3 is provided on a front surface of the semiconductor base 1. Thus, the cathode electrode 3, the anode electrode 4, the flanges 5a and 5b and the insulating tube 6 seal the surfaces of the semiconductor base 1 (see FIG. 5).

As is clear from the above discussion, the manufacturing process of the phototrigger thyristor 100 is almost the same as that of the background-art phototrigger thyristor 200, and is different therefrom only in a step of connecting the second light guide 12 to the first light guide 11. Accordingly, no particular difficulty in the manufacturing process arises.

In the phototrigger thyristor 100, unlike the background-art phototrigger thyristor 200, the light travelling from the light transmission window 8 to the light receiving part 2 is transmitted first through the first light guide 11 of a linear single core construction and next through the second light guide 12 which is bent and of a multicore construction.

The single core construction achieves a high light mixing effect, and therefore, even if the diameter of the face for outgoing radiation of the optical fiber 16 which transmits the light signal to the light transmission window 8 is small, the diameter of the transmitted light is enlarged at the face for outgoing radiation of the first light guide 11. In other words, the first light guide 11 has a function of making a distribution of light intensity uniform.

On the other hand, the multicore construction has little light mixing effect. In general, an optical fiber of smaller diameter has less variation in numerical aperture even if bent. Therefore, if the optical fiber has multicore construction consisting of a plurality of thin single cores, it would have little variation in distribution of incident light intensity even if bent. In other words, the second light guide 12 has a function of transmitting the light to the light receiving part 2 without breaking uniformity of light intensity distribution achieved by the first light guide 11.

Thus, the light receiving part 2 can receive the light with high uniformity of light intensity distribution even if the optical fiber 16 transmitting the light signal to the light transmission window 8 has a face for outgoing radiation of small diameter. As a result, the light receiving part 2 receives no particular local intense light, and it therefore becomes possible to avoid a current crowding at the initial turn-on of the phototrigger thyristor 100 and thereby suppress a drop of di/dt capability.

It is desirable that the first light guide 11 should have a wide face for incidence, for easy alignment with the optical fiber 16. For the same reason, it is desirable that the second light guide 12 should have a face for incidence which is wider than the face for outgoing radiation of the first light guide 11. On the other hand, the face for outgoing radiation of the second light guide 12 is limited in width for proper transmission of uniform light to the light receiving part 2. Accordingly, the second light guide 12 may be tapering so that its face for incidence is wider than its face for outgoing radiation. Similarly, the first light guide 11 may be tapering so that its face for incidence is wider than its face for outgoing radiation.

There may be a case where the face for incidence of the second light guide 12 and the face for outgoing radiation of the first light guide 11 are out of contact for the purpose of avoiding damage of both light guides in a fabricating process, as shown in FIG. 6. In this case, desirably, the following requirements should be satisfied.

Figure 9:
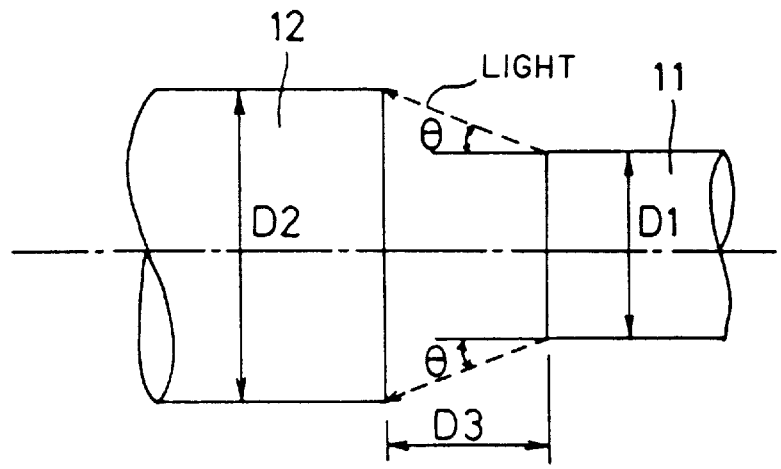
FIG. 9 is a magnified cross sectional view of the joint region A and its vicinity shown in FIGS. 3 to 5.

FIG. 9 is a further magnified cross sectional view of FIG. 6. In this figure, the face for outgoing radiation of the first light guide 11 having a diameter D1 and the face for incidence of the second light guide 12 having a diameter D2 are opposed to each other and separated by a distance D3. Taking a case where center axes of both light guides agree for simple discussion, it is desirable that the following relations should hold in the connection of both light guides for transmission of all the lights given by the face for outgoing radiation of the first light guide 11 through the second light guide 12.

$$D1 + 2 \cdot D3 \tan\theta \leq D2, \ \theta = \sin^{-1}(A1/n), \ A1 \leq A2$$

where A1 and A2 represent respective numerical apertures of the first and second light guides 11 and 12 and n represents an index of refraction of a medium in a space between the opposed first and second light guides 11 and 12.

The above formulae can be satisfied by controlling D1, D2, D3, A1, A2 and n. Since D1 ≦D2, easy alignment between the face for outgoing radiation of the first light guide 11 and the face for incidence of the second light guide 12.

While the invention has been shown and described in detail, the foregoing description is in all aspects illustrative and not restrictive. It is therefore understood that numerous modifications and variations can be devised without departing from the scope of the invention.

We claim:

1. A phototrigger thyristor, comprising:
    a light receiving part for receiving light which serves as a trigger in a thyristor operation;
    a light guide having a face for outgoing radiation facing the light receiving part to transmit said light to said light receiving part and a face for incidence, wherein
    said light guide includes
    a first portion which is almost linear, having said face for incidence;
    a second portion which is bent, having said face for outgoing radiation, and said first portion has a higher light mixing effect than said second portion.

2. The Phototrigger thyristor of claim 1, wherein
    a number of cores in said first portion is fewer than a number of cores of said second portion.

3. The phototrigger thyristor of claim 2, wherein
    said first portion is of single core construction, and said second portion is of multicore construction.

4. The phototrigger thyristor of claim 3, wherein said second portion includes cores each having an almost hexagonal section.

5. The phototrigger thyristor of claim 1, wherein
    said first portion and said second portion are separated from each other at a distance D3, and
    $D1+2 \cdot D3 \cdot \tan\theta \leq D2$, $\theta=\sin^{-1}(A1/n)$, $A1 \leq A2$ hold where D1 and D2 represent respective apertures of said first and second portions, A1 and A2 represent respective numerical apertures of said first and second portions and n represents an index of refraction of a substance separating said first and second portions.

6. The phototrigger thyristor of claim 1, wherein said second portion is tapering towards said light receiving part.

7. The phototrigger thyristor of claim 1, wherein
    said first portion and said second portion are separated from each other,
    said first portion is tapering towards said light receiving part, and
    said first portion has a smaller aperture at an end close to said light receiving part than an aperture at an end of said second portion away from said light receiving part.

8. A phototrigger thyristor, comprising:
    a light receiving means for receiving light which serves as a trigger in a thyristor operation;
    a light guide means having a face for outgoing radiation to transmit said light to said light receiving means and a face for incidence, wherein
    said light guide means includes
    a first means which is almost linear, having said face for incidence;
    a second means which is bent, having said face for outgoing radiation, and
    said first means has a higher light mixing effect than said second means.

9. The phototrigger thyristor of claim 8, wherein
    a number of cores in said first means is fewer than a number of cores in said second means.

10. The phototrigger thyristor of claim 9, wherein
    said first means is of single core construction, and said second means is of multicore construction.

11. The phototrigger thyristor of claim 10, wherein
    said second means includes cores each having an almost hexagonal section.

12. The phototrigger thyristor of claim 8, wherein
    said first means and said second means are separated from each other at a distance D3, and
    $D1+2 \cdot D3 \cdot \tan\theta \leq D2$, $\theta=\sin^{-1}(A1/n)$, $A1 \leq A2$ hold where D1 and D2 represent respective apertures of said first and second means, A1 and A2 represent respective numerical apertures of said first and second means and n represents an index of refraction of a substance separating said first and second means.

13. The phototrigger thyristor of claim 8, wherein
    said second means is tapering towards said light receiving means.

14. The phototrigger thyristor of claim 8, wherein
    said first means and said second means are separated from each other,
    said first means is tapering towards said light receiving means, and
    said first means has a smaller aperture at an end close to said light receiving means than an aperture at an end of said second means away from said light receiving means.

* * * * *